May 22, 1951

C. R. MINER ET AL

DUAL STYLUS PHONOGRAPH PICKUP FOR MULTISPEED RECORD PLAYERS

Filed Sept. 19, 1949

2,554,209

Inventors;
Carroll R. Miner;
Edward J. Zikmund,
by Merton D. Moore
His Attorney.

Patented May 22, 1951 2,554,209

UNITED STATES PATENT OFFICE 2,554,209

DUAL STYLUS PHONOGRAPH PICKUP FOR MULTISPEED RECORD PLAYERS

Carroll R. Miner, Liverpool, and Edward J. Zikmund, North Syracuse, N. Y., assignors to General Electric Company, a corporation of New York Application September 19, 1949, Serial No. 116,428

15 Claims. (Cl. 179—100.41)

Figure 1:
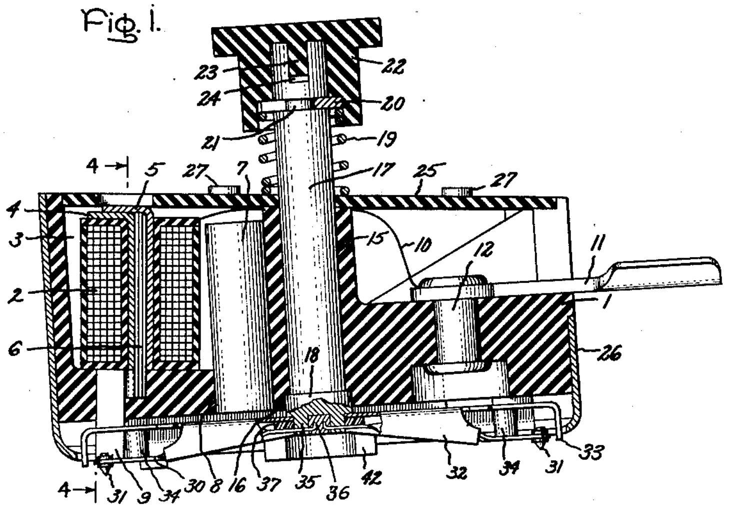

Our invention relates to electric translating devices of the phonograph pickup type and, more particularly, to phonograph pickups which are suitable for use with phonograph records having different groove sizes. It is a primary object of our invention to effect certain improvements in the construction of phonograph pickups which are provided with a plurality of record engaging styli suitable for reproducing phonograph records of different groove sizes.

Present day phonograph pickup arms, in many instances, employ a cantilever type stylus support because of the facility with which the correct lateral and vertical compliance of the stylus may be obtained by such an arrangement. Such lateral and vertical compliance is necessary to enable the stylus to follow the lateral undulations of the record groove and also to accommodate the vertical movements of the stylus which may be due to pinch effect and the like.

Such a cantilever type construction, for example, is shown in an application of W. S. Bachman, S. N. 638,378, which was filed on December 29, 1945 now Patent 2,511,663, issued June 13, 1950 and assigned to the same assignee as the present invention, wherein a pair of pole pieces included in a magnetic path are arranged on opposite sides of the free end of a cantilever type stylus support arm. Thus, as the stylus is moved laterally in engagement with the record to be reproduced the flux in the magnetic path is varied in accordance with the vibrations of the stylus. A pair of coils associated with the magnetic structure is utilized to produce electrical currents, the frequency components of which vary in accordance with the variations of the stylus caused by the record.

In prior art phonograph pickups arranged to reproduce records of different groove size and having a plurality of different sized record-engaging styli, it is customary to employ a construction wherein each stylus is affected to some extent by the other stylus of the dual stylus assembly. This necessitates a compromise in the design of each stylus and a sacrifice in the performance of each stylus, in frequency response, tracking, loading and the like.

Also, with the advent of phonograph records of different groove sizes, such as the long-playing record and the like, several additional problems arise in connection with the modifications of a cantilever-type pickup to a dual stylus arrangement. The delicate cantilever arm must be inserted into and removed from closely spaced pole pieces and must be oriented accurately therebetween, yet the construction must be sufficiently rugged to withstand the harsh treatment accorded the equipment by the average user thereof. The orientation means should preferably be automatic in operation so that, once the particular selected cantilever arm is in the general area of the pole pieces, the arm is automatically snapped into accurate alignment between the pole pieces without necessitating further tedious and time consuming adjustment on the part of the operator. Additionally, the cantilever type stylus support arms must be carefully protected during the actual use of the arm, during the process of selecting a particular arm and also during periods of non-use, when another arm carrying a different size stylus has been selected for use. The stylus selecting means should also preferably be made readily accessible to the operator.

It is an object of our invention, therefore, to provide a new and improved phonograph pickup of the cantilever support arm type wherein two or more support arms carrying different sizes record-engaging styli may be selectively employed to record or reproduce phonograph records of different groove sizes.

It is a further object of our invention to provide a new and improved dual stylus phonograph pickup in which each stylus is independent of the other and no sacrifice in the performance of either stylus is made.

It is a further object of our invention to provide a new and improved phonograph pickup of dual stylus construction in which the vibrating elements of the pickup are fully protected at all times from accidental damage by the user thereof.

It is a still further object of our invention to provide a new and improved dual stylus phonograph pickup in which a plurality of cantilever-type stylus support arms are provided with individual guard means which protect the arms during selection of particular ones thereof.

It is another object of our invention to provide a new and improved pickup of dual stylus construction wherein cantilever type support arms are normally disposed within corresponding recesses in the bottom surface of the pickup so as to protect the same during periods of use.

Briefly, in accordance with our invention, there is provided a unitary support member adapted to be mounted on a conventional tone arm, within which is positioned electric current generating means responsive to vibrations of a particular selected stylus. The multi-stylus assembly comprises a post member which is journalled vertically in the support member and is spring biased to an upward position, to the bottom end of which is rigidly attached one end of a plurality of cantilever stylus support arms and channel shaped guard means therefor. The cantilever arm assemblies are normally disposed within channel-shaped recesses formed in the bottom of the support member. The pole pieces of the electric current generating means are disposed on opposite sides of one of the recesses. A boss portion is provided which extends below the bottom surface of the support and is located adjacent the vertically journalled post member and acts as a bearing surface for the multi-stylus assembly. When the assembly is depressed, by means of a knob positioned on the other end of the post and accessible from the top of the pickup, so as to free the channel shaped guards from their respective recesses, the assembly may then be rostated so as to allow different sized styli to be placed within the recess associated with the pole pieces.

In a preferred embodiment, projections located adjacent the pole pieces and extending therebelow act as a centering means for the particular selected stylus arm so that the stylus assembly, once rotated to approximately the correct position, is snapped into place by means of the spring biasing force exerted thereon. The projections operate to prevent entry of the selected stylus arm until the exact orientation with respect to the pole pieces is obtained.

Figures 2, 3, 4, 5, 6:
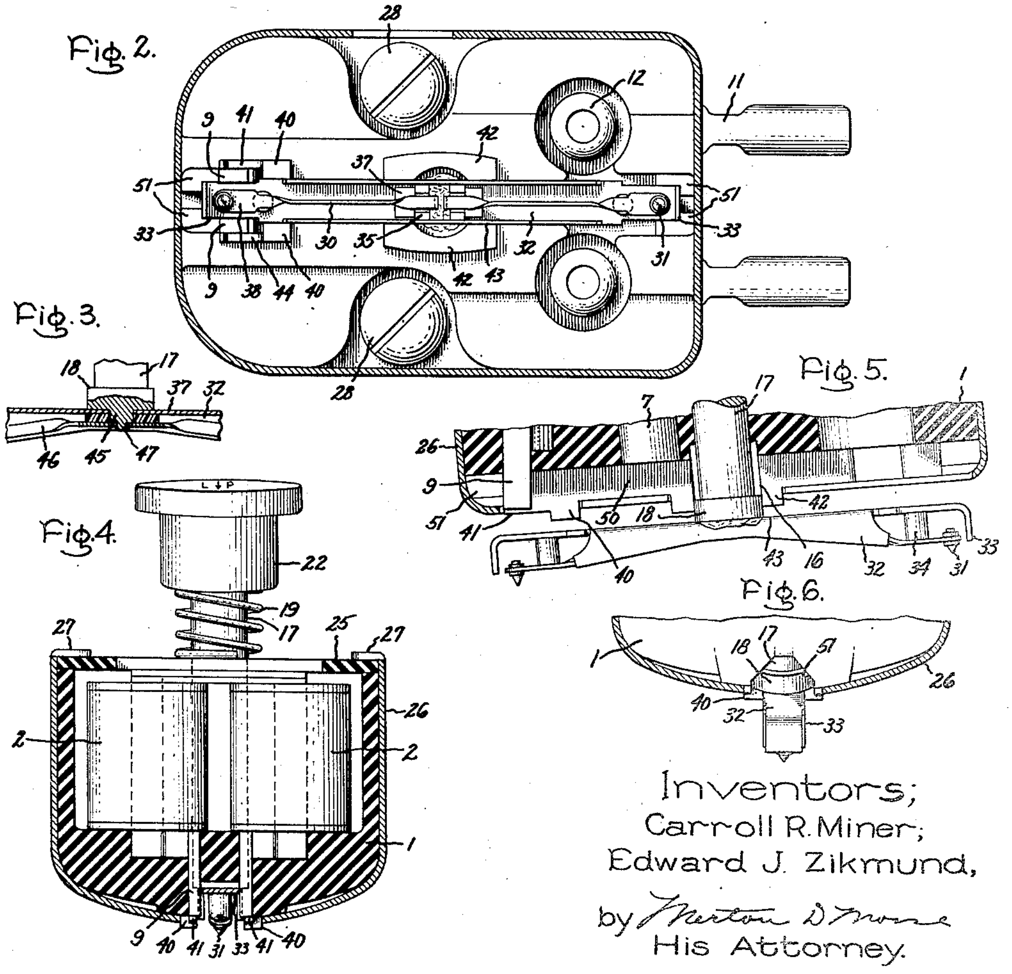

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing, in which Fig. 1 is a sectional side elevation view of a dual stylus phonograph pickup embodying our invention; Fig. 2 is a bottom plan view, partly in section, of the pickup shown in Fig. 1; Fig. 3 is a sectional side elevation view of a portion of the dual stylus assembly illustrating an alternative embodiment thereof; Fig. 4 is an end elevational view, partly in section, taken along the lines 4—4 of Fig. 1; Fig. 5 is a sectional side elevation view of a portion of the pickup of Fig. 1 showing the dual stylus assembly in extended position; and Fig. 6 is an end view of the portion of the pickup shown in Fig. 5.

Referring to Fig. 1 of the drawing, we have illustrated our improved phonograph pickup as comprising a unitary support member 1, which may be formed of any suitable plastic material, the forward portion of which contains a recess which encloses the operative elements of the pickup. Thus, a pair of coils 2 are supported in a recess 3 formed in support member 1. The respective coils 2 surround different legs of a pair of ferro-magnetic yoke members 4, 5 and a plurality of magnetic laminations 6 are positioned between the yoke members 4, 5. Magnetic flux which transverses the coils 2 is provided by a permanent magnet 7, preferably formed of a suitable aluminum-nickel-cobalt alloy, which magnet is supported in a recess 8 formed in the base member 1. The yoke 4, 5 and laminations 6 likewise are supported by placing the lower ends of these members in a suitable recess provided in base member 1. A pair of pole pieces 9 associated with respective ones of the coils 2 are wedged into suitable openings provided in the base member 1.

The coils 2 are connected in series relation and are electrically connected by means of a pair of conductors 10 to output terminals 11. Terminals 11 are secured to base member 1 by means of rivets 12, or the like.

In accordance with our invention, the base member 1 is provided with a centrally located vertically extending opening 15 having an enlarged bore 16 at the lower end thereof. Journalled vertically in opening 15 is a post member 17, the bottom end of which is provided with a collar 18 which corresponds in outside diameter to bore 16. Post 17 is biased to an upward position by means of a helical spring 19, which is positioned around the post 17, the upper end of which is retained by means of a C-washer 20, which may be snapped into place in a groove 21 formed in the upper end of post 17. The upper end of post 17 is slotted to form a keyway into which may be placed the key portion of an operating knob 22. Operating knob 22 is fitted over the end of post 17 and rotated so that the key portion 23 thereof engages the keyway 24 formed in upper end of post 7.

To enclose the operative elements of the pickup in a dust-proof manner, there is provided a cover member 25 which is provided with a central aperture for the post 17 and which rests upon the central portion of the base member adjacent the opening 15. A metallic case 26 surrounds the support member 1 and is attached to the pickup assembly by means of a plurality of ears 27 which are bent over the edge of cover 25. In order that the pickup may be attached to the tone arm of a record player, we provide a pair of screws 28 which extend through apertures provided therefor in base member 1.

To provide a dual stylus assembly, a plurality of cantilever-type stylus support arms 30 are positioned at right angles to the post member 17 and one end of the arms 30 is rigidly attached thereto. The arms 30 may be in the form of a twisted ribbon of suitable magnetic material, such as, for example, tool steel or the like, and the arms are rigidly secured at one end by soldering in a slot provided in the end of post member 17. At their other end, the arms 30 are provided with different sized record engaging styli 31. Preferably, the styli 31 are of the semi-permanent type and may comprise, for example, a jewel, such as a sapphire.

In order that the cantilever type support arms 30 are fully protected both during use and during the selection of various size styli, we provide a guard member 32 which is rigidly attached to the end of post member 17. Guard 32 is of channel shaped construction, and is of a configuration generally similar to that of the support arms 30 so that the arms are positioned within the channel formed by the bottom and sides of the guard member 32. The end portions 33 of guard member 32 are also made to extend downwardly around the end of the respective stylus support arms 30 so as to protect the same from accidental damage by the user. The guard means 32 forms no part of the magnetic circuit of the pickup but is rather composed of a non-magnetic material so that it diverts none of the flux which passes between magnet 7 and pole pieces 9 by means of ferromagnetic cantilever arms 30. Small blocks 34 of cellulose nitrate plastic or similar material are positioned between the guard member 32 and the outer ends of arms 30 at a point just forward of the second twist therein and provide sufficient damping to restrain undesired modes of vibration of the cantilever arms 30.

The guard member 32 and cantilever arms 30 are rigidly secured to the lower end of post 17 in a manner also shown in Fig. 1. As illustrated in this figure, the post 17 is provided with a plurality of projections 35 which extend through the guard member 32 and which are spaced to form transverse and longitudinal slots therebetween. The arms 30 are provided with hooklike portions 36 which fit within the transverse slot thus formed, the adjacent portions of arms 30 fitting within the longitudinal slots provided between projections 35. The pocket formed between projections 35 and the slots within which the cantilever arms are positioned are filled with solder so that the assembly comprising guard 32 and cantilever arms 30 is securely attached to post 17.

In order further to damp undesired modes of vibration of the cantilever arms and also to prevent undesirable needle talk, or direct acoustic radiation from the pickup, we provide additional blocks 37 of damping material, such as cellulose nitrate plastic or similar material, which are positioned immediately adjacent projections 35 between the guard member 32 and the secured end of arms 30.

We also provide means for orienting the dual stylus assembly and its associated cantilever arms 30 to assure that, when the stylus assembly comprising guard member 32 and support arms 30 is urged upwardly by means of spring 19, the end of the cantilever arm bearing the record engaging stylus is positioned substantially midway between pole pieces 9. In order to accomplish this, the end portions 33 of guard member 32 are of reduced width so as to fit between pole pieces 9, as is best illustrated in Fig. 2. Inasmuch as the cantilever arms 30 are rigidly attached to the guard means 32 through the common post member 17, orientation of the end portions 33 of the guard 32 between the pole pieces 9 assures proper orientation of the enlarged armature-like end portion 38 of the cantilever arm 30.

In order that the end portion of the guard may be accurately centered between the pole pieces 9 and to the end that the entire dual stylus assembly may be snapped into position once the approximate orientation is arrived at by the user, there is provided adjacent the pole pieces 9 a pair of projections 40 which are integral with support member 1 and which extend below the lower ends of the pole pieces 40. Projections 40 prevent the guard member 32 during rotation thereof from dropping into place until accurate orientation positioning has taken place. At such time, the particular selected cantilever arm is accurately centered over the pole pieces 9.

Fig. 2 is a bottom plan view of the phonograph pickup which illustrates the relative positioning of the end portions 33 of the guard 32, the pole pieces 9 and the projections 40, which, as described above, act as an automatic centering means for the stylus assembly. This figure, moreover, illustrates more clearly the relative positioning of protective ridges 41 which are integral with the support member 1 and which are formed immediately adjacent the pole pieces 9 so as to protect the same from damage during use. It will be appreciated that the ridges 41 do not extend downwardly as far as the projections 40. Therefore, the ridges 41 serve to protect the pole pieces 9 and do not interfere with the automatic centering action of projections 40 which has been described heretofore.

In a dual-stylus phonograph pickup of the type herein described, it is difficult for the operator of the selector mechanism to depress the dual-stylus assembly against the bias of spring 19 and maintain the assembly depressed while rotating it 180°. On the other hand, the assembly must be held in a position substantially below the pole pieces until the particular cantilever arm is effectively positioned over the pole pieces. To enable the selection of different cantilever arms to be made without the necessity of maintaining the assembly completely depressed throughout the process, we provide a pair of centrally located boss portion 42 which are integral with support member 1 and which extend below the bottom surface thereof by an amount sufficient to allow rotation of the stylus assembly with sufficient clearance of the other portions of the pickup, such as the centering projections 40. The bottom surface of boss portions 42 acts as a bearing surface on which the portions 43 of the guard member 32 adjacent the post 17 may ride during the rotation of the dual stylus assembly.

While we have illustrated a particular type of cantilever stylus support arm, namely, one in which a double twist is provided, as described and claimed in application Serial No. 124,266 of William W. Ward, which is assigned to the assignee of this application, so as to eliminate individual resonances in the cantilever and to reduce needle talk of the assembly, it will be understood that other types of cantilever support arms may equally well be employed in our improved construction of a dual stylus phonograph pickup. Such an alternative arrangement is illustrated in Fig. 3 wherein there is illustrated a portion of our dual stylus assembly in modified form. Referring to this figure, the post 17 is provided with a central stud portion 45 which is adapted to project through a corresponding aperture in guard member 32. A single twisted ribbon 46 replaces the separate cantilever arms 30. Stud 45 is provided with an end portion 47 of reduced diameter which extends through a corresponding aperture in the center of ribbon 46, the end portion 47 being deformed, as by peening-over, or the like, to secure the ribbon 46 to the stud portion 45. It will be understood that the ribbon 46 is thus rigidly secured to the post 17 so that each section of the ribbon 46 acts as a cantilever arm, as described heretofore, and the opposed ends of ribbon 46 may be selected for use without sacrifice in the performance of either portion thereof.

Fig. 4 is a front view of the pickup and illustrates the positioning of the reduced end portion 33 of guard member 32 relative to pole pieces 9, the protective ridges 41 and centering projections 40. This figure, moreover, illustrates the relative position of the recesses wherein are located the electric current generating portions of the pickup, including the coils 2 and the associated magnetic structure.

To provide an indication of the size of the particular stylus which has been selected, an arrow or other suitable indicia may be placed upon the upper surface of selector knob 17, the position of the arrow indicating the relative position of the particular stylus associated therewith. Thus, as the arrow bearing the legend LP, for long playing records, is rotated to a position pointing toward the forward end of the pickup, the cantilever arm bearing a record engaging stylus suitable for reproducing long playing records is positioned within the air gap between pole pieces 9.

Fig. 5 is a sectional side elevation view of the lower portion of the pickup wherein the dual stylus assembly is illustrated as being depressed a sufficient amount so as to free the guard member 23 from the complementary channel shaped recess 50, which is formed in the bottom surface of the base member 1. Channel shaped recess 50 extends longitudinally of the pickup and intersects the lower end of vertically extending opening 15 so as to provide a suitable chamber for receiving the dual stylus assembly when the same is urged to an upward position by the biasing action of spring 19. This figure also illustrates more clearly the positioning of boss portions 42 which are provided adjacent the sides of bore 16, the lower surface of which act as a bearing surface for the adjacent portions 43 of the guard member 32. It will be appreciated that the stylus assembly is illustrated as depressed by an amount sufficient to clear the lower surfaces of boss portions 42.

While in the depressed position shown in Fig. 5, the stylus assembly is rotated slightly so that the portions 43 of guard member 32 engage the shoulders of boss portions 42. Thereafter, the pressure on the selected knob 22 may be released and the knob merely rotated approximately 180°. As the 180° point is reached, the boss engaging portions 43 again encounter the shoulders of the bosses and are urged into alignment with channel 50, due to the wedging action therebetween. As the guard member approaches channel 50, the outer portions thereof encounter the projections 40, which keep the guard member from entering channel 50 until the end portions 33 of the assembly are accurately positioned over the pole pieces 9.

In order that the end portions 33 of the guard member may freely enter the air gap between the pole pieces 9 without catching on the edges thereof, the end portions 33 are preferably of somewhat smaller width than the distance between pole pieces 9, thus providing a substantial clearance between these members. To provide additional orientation means whereby the end portions 33, which have a loose fit within the pole pieces 9, may be accurately centered midway between the pole pieces and to provide a single point support for the outer ends of the dual stylus assembly, we provide means for wedging the end portions 33 into the center portion of channel 50. Preferably, such centering action is obtained by providing the walls of channel 50 with inwardly sloping portions 51 at the ends thereof, these inwardly sloping portions forming a sloping-sided trough at the ends of channel 50 into which the end portions 33 of guard member 32 are wedged by virtue of the biasing force of spring 19.

Inasmuch as the center plane of the sloping-sided trough formed by portions 51 is coincident with the center line of the air gap, the end portions 33 which enter the air gap are oriented symmetrically with respect to this center plane and, hence, the end portion 33 of a particular selected cantilever arm is correspondingly oriented midway between the pole pieces 9.

It will be appreciated that the dual stylus assembly, when biased to an upward position by spring 19, is supported only at the end portions 33 of the guard member, by engagement with the shoulders 51, so that a two point suspension of the dual stylus assembly is provided. By such construction, the possibility of the guard member 32 being wedged or jammed into the channel 50 is avoided and the dual stylus assembly may be smoothly and easily positioned within or removed from the channel without fear of injury to the same.

Fig. 6 is an end view of the portion of the pickup shown in Fig. 5 and illustrates more clearly the positioning of sloping shoulders 51, which form a sloping-sided trough at the ends of channel 50. It will be understood that the end portions 33 of the guard member 32 are urged upwardly into engagement with the shoulders 51 so as accurately to center a particular selected cantilever arm within the air gap.

In the operation of the reluctance type phonograph pickup herein described, the portion 38 of a selected cantilever arm 30 is centered in the air gap between pole pieces 9 and, when the stylus 31 is vibrated upon engagement with the groove of a record to be reproduced the vibrations of the stylus produce corresponding changes in the magnetic flux passing through the portions of the yokes and laminations 4, 5 and 6 within the coils 2. When the stylus is in its mid position, as shown in Fig. 2, substantially the same amount of flux passes through both coils. However, when the stylus is displaced toward one pole piece, a greater amount of flux flows in that coil, due to the reduced air gap in that portion of the magnetic path, there being an increase of flux in one coil and a decrease in the other. When the cantilever arm is operated within a predetermined range, for example, with an unbalanced load on the stylus of the order of one-fourth of an ounce, the frequency characteristic of the pickup is linear and the stylus follows the sound track accurately.

If a record having a different size sound track is to be played, the stylus assembly is depressed against the bias of spring 19 and rotated approximately 180° whereupon the other end of guard member 32 is automatically snapped into position between the pole pieces 9 with the enlarged portion 38 of the cantilever arm accurately positioned midway between the pole pieces. By providing a two point suspension at the ends of the stylus assembly and urging the assembly into contact therewith by means of spring bias applied between the suspension points, the assembly may readily be placed in and removed from its complementary recess in the support member without danger of improper seating of the assembly or jamming of the same into the recess. Inasmuch as the cantilever arms are disposed within the confines of the guard member 23 during the entire selection process and because the guard member is normally positioned within the channel shaped recess 50 formed in the bottom surface of the pickup, the entire dual stylus assembly is completely protected during the actual use of a cantilever arm, during the process of selecting a different arm, and also during the periods of non-use of the other arm. Also, due to the fact that each cantilever arm is operative only during those periods when it is positioned between the pole pieces, no sacrifice in the performance of either cantilever arm is made in tracking ability, frequency response, or the like.

While the invention has been described by reference to a particular embodiment thereof, it will be understood that numerous modifications may be made by those skilled in the art without departing from the invention. We, therefore, aim in the appended claims to cover all such equivalent variations as come within the true spirit and scope of our invention.

What we claim as new and desire to secure by Letters Patent of the United States is:

1. In a magnetic phonograph pickup assembly, the combination of a support member having a longitudinally extending slot in the bottom surface thereof, magnetic circuit means including a pair of pole pieces arranged on either side of said slot adjacent one end thereof, a pair of cantilever stylus support arms adapted to be selectively positioned within said slot in the magnetic field of said pole pieces, means for supporting one end of each of said arms opposite an intermediate point within said slot and manually-operable means for selectively translating said arms into and out of said slot and for rotating said arms as a unit on a transverse axis, whereby either of said arms may be selectively employed to form a portion of said magnetic circuit.

2. In a magnetic phonograph pickup assembly, the combination of a support member having a longitudinally extending slot formed in the bottom surface thereof and having a transverse opening extending therethrough, magnetic circuit means including a pair of pole pieces arranged on either side of said slot adjacent one end thereof, and a dual stylus assembly comprising a post member journaled for rotation within said opening and a pair of cantilever stylus support arms, each of said arms having one end thereof rigidly attached to said post, said arms extending transversely of said post in opposite directions therefrom and being adapted to fit within said slot, spring means for biasing said post member axially to a position in which said cantilever arms are disposed within said slot, said post being depressable and rotatable on an axis transversely intersecting the axis of said slot, whereby either of said support arms may be selectively employed to form a portion of said magnetic circuit.

3. In a magnetic phonograph pickup assembly, the combination of a support member having a longitudinally extending channel formed in the bottom surface thereof and having a transverse opening extending therethrough, magnetic circuit means positioned within said support member and including a pair of pole pieces arranged on either side of said channel adjacent one end thereof, and a dual stylus assembly comprising a post member rotatably supported on an axis transversely intersecting the axis of said slot, a pair of cantilever stylus support arms secured to said post member and extending transversely of said post in opposite directions therefrom, said arms being adapted to fit within said slot, and a guard member surrounding said support arms and arranged to fit into said channel, said post being movable axially and rotatable, whereby either of said support arms may be selectively employed to form a portion of said magnetic circuit.

4. In a magnetic phonograph pickup assembly, the combination of a substantially horizontal support member having a longitudinally extending slot formed in the bottom surface thereof and having a vertical opening intersecting said slot and extending therethrough, magnetic circuit means positioned within said support member including a pair of pole pieces arranged on either side of said slot adjacent one end thereof and positioned to form an air gap therebetween, a dual stylus assembly comprising a post member rotatably supported on a substantially vertical axis passing through said opening, a pair of cantilever-type stylus support arms secured to said post member and extending transversely of said post in opposite directions therefrom, a channel shaped guard member surrounding said support arms and arranged to fit into said slot, said guard member also being secured to said post and having reduced end portions arranged to enter said air gap when said guard is disposed within said slot, said post being depressable and rotatable, whereby either of said support arms may be selectively employed to form a portion of said magnetic circuit.

5. The combination, in a magnetic phonograph pickup of the variable reluctance type, of a pair of pole pieces, a rotatable shaft adjacent said pole pieces, a pair of resilient cantilever stylus support arms of magnetic material each having one end rigidly secured to one end of said shaft, said arms extending in different directions from said shaft, said shaft being movable axially and also rotatable so as to selectively position either of said arms between said pole pieces, means for selectively locking said shaft against rotation when either of said arms is so positioned between said pole pieces, and means to complete a magnetic circuit through said pole pieces and that selected one of said arms positioned therebetween.

6. The combination, in a magnetic phonograph pickup of the variable reluctance type, of a supporting member, a pair of magnetic pole pieces and a pivot member mounted in said supporting member, a channel member mounted in said supporting member and defining a channel extending transversely between said pole pieces and adjacent said pivot member, a pair of cantilever stylus carrying members each having one end secured to said pivot member, said cantilever members extending from said pivot member in opposite directions in a plane parallel to said channel, said pivot member being both axially movable and rotatable to position either of said cantilever members within said channel between said pole pieces, spring means urging said pivot member axially in a direction to seat said cantilever members in said channel, a cam member carried by said pivot member and constructed so as to engage said channel member and maintain said cantilever members out of engagement with said channel during rotation thereof through positions out of alignment with said channel, and means to complete a magnetic circuit through said pole pieces and that one of said stylus-carrying members positioned therebetween.

7. The combination, in a magnetic phonograph pickup of the variable reluctance type, of a supporting member, a pair of magnetic pole pieces and a rotatable shaft mounted transversely of one face of said supporting member, means defining a channel in said face extending between said pole pieces and intersecting the axis of said shaft, a pair of cantilever stylus carrying members each secured at one end to said shaft and extending from said shaft in opposite directions in a plane parallel to said channel, said shaft being both axially movable and rotatable to position either of said cantilever members within said channel between said pole pieces, a spring cooperating with said shaft and urging it in an axial direction to seat said cantilever members in said channel, a cam member carried by said shaft and arranged to maintain said cantilever members out of engagement with said channel during rotation thereof through positions out of alignment with said channel, centering members mounted adjacent said channel near said pole pieces to center the respective stylus-carrying members accurately in said channel between said pole pieces, and means to complete a magnetic circuit through said pole pieces and that one of said stylus-carrying members positioned therebetween.

8. The combination, in a magnetic phonograph pickup of the variable reluctance type, of a supporting member, a pair of magnetic pole pieces and a pivot shaft mounted in said supporting member, means defining a channel extending between said pole pieces and adjacent said pivot shaft, a pair of cantilever stylus-carrying arms mounted on and extending from said pivot shaft in opposite directions in a plane parallel to said channel, said pivot shaft being axially depressable and rotatable to position either of said arms within said channel between said pole pieces, a guard member carried by said pivot shaft and arranged to enter said channel only when said cantilever arms are accurately aligned with said channel, boss members mounted adjacent said shaft and arranged to engage and provide a bearing surface for said guard member, said boss members positively maintaining said shaft in depressed position during rotation of said arms through intermediate positions thereof, and means to complete a magnetic circuit through said pole pieces and that one of said stylus-carrying arms positioned therebetween.

9. The combination, in a magnetic phonograph pickup of the variable reluctance type, of a supporting member, a pair of magnetic pole pieces and a pivot shaft mounted in said supporting member, a channel member mounted in said supporting member and defining a channel extendin between said pole pieces and adjacent said pivot shaft, a pair of cantilever stylus-carrying arms mounted on and extending from said shaft in opposite directions in a plane parallel to said channel, spring means urging said shaft axially in a direction to seat said arms in said channel, manually-operable means for depressing said shaft in the opposite direction and for rotating it to position either of said arms in alignment with said channel between said pole pieces, a guard member carried by said shaft and arranged to enter said channel only when said cantilever arms are accurately aligned with said channel, said guard member being constructed to positively maintain said shaft depressed and said cantilever arms out of engagement with said channel during rotation of said arms through intermediate positions thereof, said guard member having end portions of reduced width and arranged to enter said air gap when said guard is disposed within said channel, and means to complete a magnetic circuit through said pole pieces and that one of said stylus-carrying arms positioned therebetween.

10. The combination, in a magnetic phonograph pickup of the variable reluctance type, of a supporting member, a pair of magnetic pole pieces and a pivot shaft mounted in said supporting member, means defining a channel having an axis extending between said pole pieces and intersecting the axis of said pivot shaft, a pair of cantilever stylus-carrying arms mounted on and extending from said shaft in opposite directions in a plane parallel to said channel, said shaft being axially depressable and rotatable to position either of said arms within said channel between said pole pieces, a guard member carried by said shaft and arranged to enter said channel only when said cantilever arms are accurately aligned with said channel, said guard member being constructed to positively maintain said shaft depressed and said cantilever arms out of engagement with said channel during rotation of said arms through intermediate positions thereof, said channel having sloping sides adjacent the ends thereof constructed to positively engage the end portions of said guard when said guard is disposed within said channel, and means to complete a magnetic circuit through said pole pieces and that one of said stylus-carrying arms positioned therebetween.

11. A magnetic phonograph pickup assembly comprising a support member having an elongated opening extending therethrough and having a plurality of equiangularly spaced transverse slots formed in the bottom surface of said support, said slots extending radially from said opening and substantially normal thereto, magnetic circuit means including a pair of pole pieces arranged on either side of one of said slots and positioned to form an air gap therebetween, a multi-stylus assembly comprising a cylindrical post member supported in said opening, a plurality of resilient record-engaging cantilever arms equiangularly spaced about said post and each having one end thereof rigidly attached thereto, said post member being axially depressable and rotatable within said opening, whereby each of said arms may be selectively positioned in said one slot to form a portion of said magnetic circuit, and means for selectively locking said post member against rotation when any selected one of said arms is so positioned in said slot.

12. A magnetic phonograph pickup assembly comprising a support member having a vertically disposed opening extending therethrough and having a plurality of equiangularly spaced horizontal channels formed in the bottom surface of said support, said channels each extending radially from said opening, magnetic circuit means positioned within said support member and including a pair of pole pieces, said pole pieces being arranged on either side of one of said channels adjacent the outer end thereof, and a multi-stylus assembly comprising, a post member supported in said opening, a plurality of cantilever stylus-support arms equiangularly spaced about said post and each having one end thereof rigidly attached thereto, and channel shaped guard means surrounding each of said support arms and arranged to fit closely into said one channel, spring means biasing said post member axially in a direction to seat a selected one of said guard members in said one channel, said post being axially depressable against said spring bias and rotatable within said opening, whereby any desired one of said cantilever arms and guard means may be selectively positioned within the channel including said pole pieces so as to form a portion of said magnetic circuit.

13. A phonograph stylus subassembly for use in a phonograph pickup head provided with a shaft bearing, comprising in combination, a shaft adapted to be journalled in said bearing, a pair of resilient cantilever pickup arms extending radially from said shaft and each having one end secured thereto, two stylus points, means securing each of said points to a different one of said arms near its free end, and a pair of cantilever indexing arms also extending radially from said shaft and each having one end secured thereto, each of said indexing arms being spaced from, and extending at the same angle with respect to, one of said pickup arms, said indexing arms being arranged selectively to engage the pickup head for retaining one of said pickup arms in operating position at a time.

14. A phonograph stylus subassembly for use in a phonograph pickup head of the variable reluctance type provided with a substantially vertical shaft bearing therein, comprising in combination, a shaft adapted to be journalled in said bearing, a pair of resilient transverse, cantilever pickup arms extending in diametrically-opposite directions from one end of said shaft and each having one end secured thereto, two different types of stylus points, means securing each of said points to a different one of said arms near its free end, and a pair of transverse cantilever indexing arms each having one end secured to said shaft at a point spaced from said one end, said indexing arms also extending in diametrically-opposite directions and being arranged selectively to engage the pickup head for retaining one of said pickup arms in operating position at a time.

15. A phonograph stylus subassembly for use in a phonograph pickup head of the variable reluctance type provided with a substantially vertical shaft bearing therein, comprising in combination, a shaft adapted to be journalled in said bearing, a pair of resilient, transverse, cantilever pickup arms extending in diametrically-opposite directions from one end of said shaft and each having one end secured thereto, two different types of stylus points, means securing each of said points to a different one of said arms near its free end, each of said pickup arms being composed of magnetic material, and a pair of transverse cantilever indexing arms each having one end secured to said shaft at a point spaced from said one end, said indexing arms being composed of non-magnetic material and each extending substantially parallel to one of said pickup arms, said indexing arms being arranged selectively to engage the pickup head for retaining one of said pickup arms in operating position at a time.

CARROLL R. MINER.
EDWARD J. ZIKMUND.

REFERENCES CITED

The following references are of record in the file of this patent:

UNITED STATES PATENTS

| Number | Name | Date |
|---|---|---|
| 1,762,175 | Huenlich | June 10, 1930 |
| 1,822,932 | Loughridge | Sept. 15, 1931 |
| 1,992,893 | Thomas | Feb. 26, 1935 |
| 2,107,050 | Bender | Feb. 1, 1938 |
| 2,113,401 | Goldsmith | Apr. 5, 1938 |
| 2,318,308 | Harris | May 4, 1943 |
| 2,388,116 | Bruderlin | Oct. 30, 1945 |
| 2,422,817 | Baker | June 24, 1947 |
| 2,526,188 | Andres | Oct. 17, 1950 |